Figure 1:
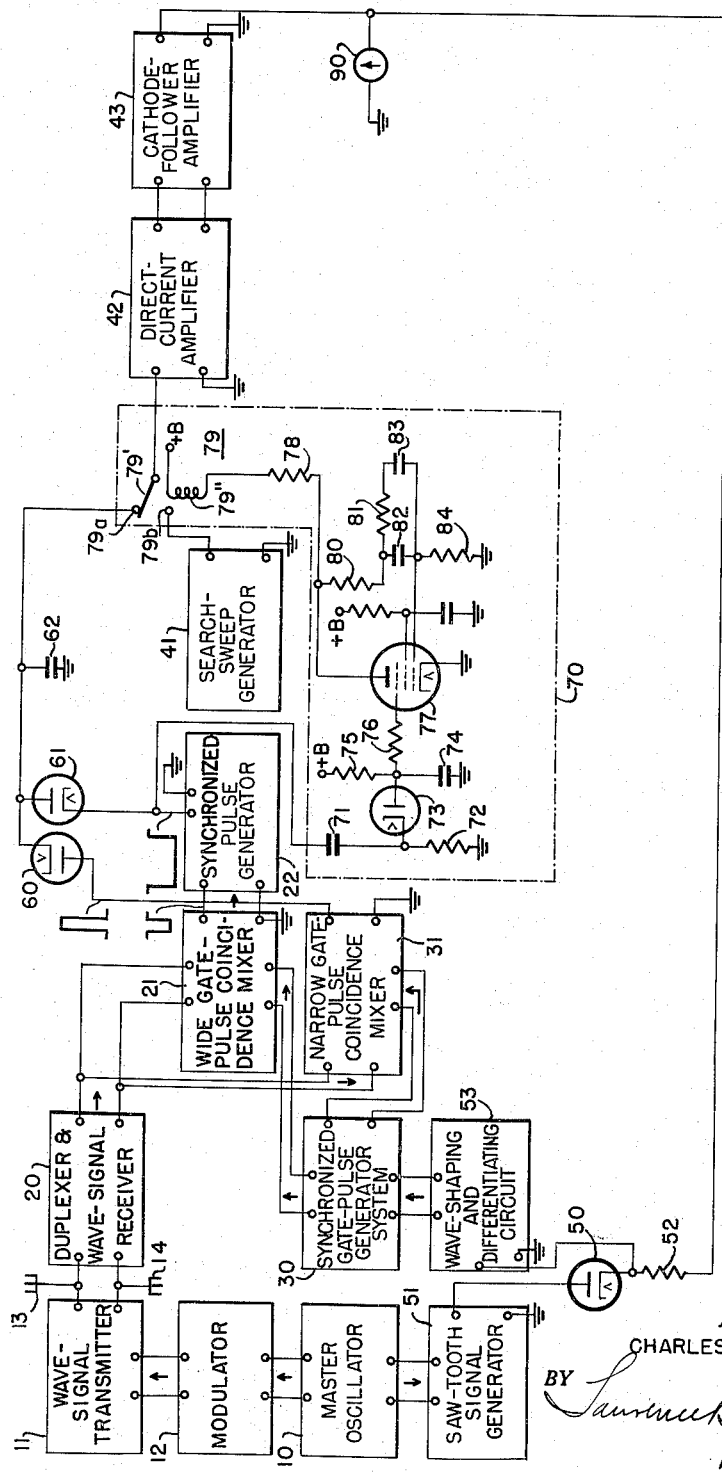

Aug. 15, 1961  C. J. HIRSCH  2,996,707
RADAR CONTROL SYSTEM
Original Filed Sept. 26, 1950  2 Sheets-Sheet 1

INVENTOR.
CHARLES J. HIRSCH
BY
ATTORNEY

Aug. 15, 1961 C. J. HIRSCH 2,996,707
RADAR CONTROL SYSTEM
Original Filed Sept. 26, 1950 2 Sheets-Sheet 2

INVENTOR.
CHARLES J. HIRSCH
BY
ATTORNEY

United States Patent Office 2,996,707
Patented Aug. 15, 1961

2,996,707
RADAR CONTROL SYSTEM
Charles J. Hirsch, Douglaston, N.Y., assignor to Hazeltine Research, Inc., Chicago, Ill., a corporation of Illinois
Continuation of abandoned application Ser. No. 186,843, Sept. 26, 1950. This application July 26, 1954, Ser. No. 445,550
6 Claims. (Cl. 343—7.3)

General

This invention is directed to a control system for target position-indicating equipments which are effective during tracking periods to track targets in response to signals indicative of those targets. This application is a continuation-in-whole of applicant's copending application Serial No. 186,843, filed September 26, 1950, and entitled "Control System for Target Position-Indicating Equipments," now abandoned. Although the invention is subject to a wide variety of applications, it is especially useful in airborne distance-measuring equipment and, hence, will be described in that environment.

Heretofore, prior distance-measuring equipments have been proposed for aircraft installation to enable a pilot to determine the distance of his craft from known beacon repliers on the ground or other objects capable of producing replies to challenging signals. For convenience, the beacon repliers or other objects producing replies to challenging signals will hereinafter be referred to simply as targets. The airborne equipment generally comprises a transmitter for sending out pulse-type challenging signals to cause responses from a selected target. The equipment also includes a receiver for receiving and interpreting the target responses or target signals in order to indicate the distance between the plane and the target. In order to enable the equipment to locate any of numerous targets, the receiver usually is provided with a search apparatus.

To accomplish searching, the receiver ordinarily includes a modulation signal-translating channel that is normally blocked and a gating system for conditioning the channel to translate pulses which may be received within a short gating interval. Varying the time relation of the gating interval relative to the transmission of the challenging signal is effective to achieve searching. This will be apparent from the consideration of an example. Assume that the receiver is gated, that is, conditioned to translate pulses immediately after the challenging signal is sent out. Then, if a target signal is returned directly, as in the case where the plane is very close to the target, that signal is accepted and a distance indication obtained. If the target signal should be delayed beyond the duration of the short gating interval, thus indicating a greater separation between the plane and the target, the target signal is not accepted. However, delaying the gating interval relative to the transmitted challenging signal may condition the receiver to accept the delayed target signal and establish an indication of the distance between the plane and the target. The airbore equipment under consideration has a search system which increases the delay of the gating interval over a range of delay times with respect to the transmission of the challenging signal to search a predetermined range of distances looking for a target from which it may ascertain its distance. When a target signal has been received, the search is discontinued and a tracking circuit is energized to keep the target signal within the gating interval to facilitate an accurate determination of distance.

It is apparent that if a single target signal were to interrupt the search, any stray signal would be able to accomplish that function and establish an erroneous indication of distance. To avoid this undesired result, the equipment may include such circuitry that at least two target signals received within the duration of the gate are necessary to develop a potential exceeding a critical level at which the search is ended and tracking initiated.

It has been found that while such a receiver is tracking a target, the target signals may be lost for any of several reasons, for example, the plane's surfaces may shield the receiving antenna of the plane during a turning operation, the plane may be beyond the line of sight from the target, or the target may have had a temporary failure in operation. Under such operating conditions it is not desirable for the equipment to resume searching immediately after the target signals have been lost since these signals may again be received after a short interval of time. Accordingly, such a prior distance-measuring equipment has ordinarily utilized a so-called "memory" circuit which conditions the equipment during a predetermined and fixed "memory" period to track the target should the target signals again be received during that period.

Prior memory circuits have proved useful but their utility is limited under operating conditions in which many planes are challenging targets because the airborne distance-measuring equipment may momentarily interrupt a search to track false signals caused by the challenging signals transmitted by other planes and the target signals responsive thereto. In prior such equipments, each time the search is interrupted the full memory period elapses before searching is resumed, and, consequently, time is undesirably lost before the true target signals are found. Accordingly, in such equipment it has generally been necessary either to utilize a memory circuit providing an undesirably short memory period or unduly to increase the time required to search over the prescribed range of distances.

It is an object of the present invention, therefore, to provide a new and improved control system for target position-indicating equipment which avoids the aforementioned limitations of prior such systems.

It is another object of the invention to provide an improved control system for target position-indicating equipment and one having a longer full memory period than was heretofore altogether practical.

It is a further object of the invention to provide a new and improved control system for target position-indicating equipment and one having a delayed and variable memory period related to the duration of a tracking period thereof.

In accordance with a particular form of the invention, a system for tracking a target by receiving target signals therefrom comprises means for searching for target signals and means for discontinuing searching and commencing tracking upon reception of target signals, the last-mentioned means effective upon cessation of reception for causing resumption of searching. The last-mentioned means also tends to be responsive to spurious signals. The system also includes means for delaying such resumption of searching by a period which is small for small numbers of signals received but which increases with the number of signals received so that after prolonged tracking search is not resumed upon momentary cessation of target signals and prolonged interruption of searching due to actuation of the search discontinuing means by spurious signals is avoided.

Also in accordance with the invention, in the art of determining target positions by searching for a target with electrical pulses and discontinuing searching and commencing tracking upon reception of target pulses wherein cessation of the target pulses is followed by a memory period before search is resumed, the step of minimizing the effect of spurious received pulses which comprises proportioning the memory period to the duration of the reception interval of the received pulses.

For a better understanding of the present invention, together with other and further objects thereof, reference is had to the following description taken in connection with the accompanying drawings, and its scope will be pointed out in the appended claims.

Figure 2:
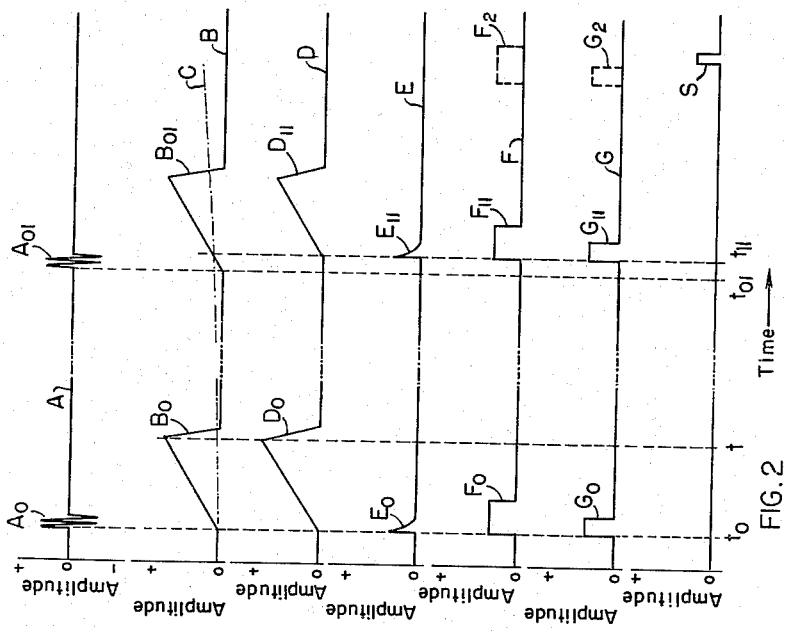
Figure 3:
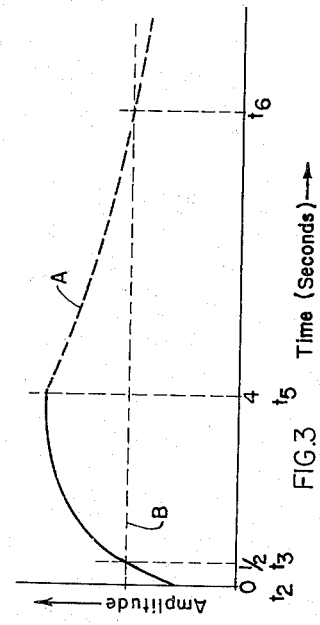
Figure 4:
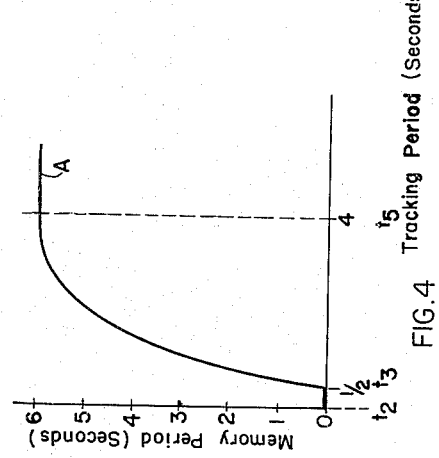

Referring to the drawings:

FIG. 1 is a circuit diagram, partly schematic, of a distance-measuring equipment including a control system in accordance with a particular form of the invention, and FIGS. 2, 3, and 4 are graphs utilized in explaining the operation of the equipment.

*General description of distance-measuring equipment*

Referring now more particularly to FIG. 1 of the drawings, the distance-measuring equipment there represented will be assumed to be installed in an aircraft. The transmitter portion of the equipment includes, coupled in cascade, a master oscillator 10, a modulator 12 and a wave-signal transmitter 11 designed to transmit challenging wave signals of pulse wave form which may comprise single pulses or groups of pulses of relatively short pulse duration in accordance with accepted practice in pulse-modulated ranging systems. The repetition rate of these signals may, for example, be thirty cycles per second. An antenna system 13, 14 is coupled to the output circuit of the transmitter 11 and also to the receiver portion of the equipment, presently to be described.

The receiver portion of the equipment comprises a duplexer and wave-signal receiver 20. The receiver of unit 20 may be any suitable type such as a superregenerator or superheterodyne receiver and preferably includes a decoder for selecting the desired target signals from random signals intercepted by the antenna system 13, 14. The duplexer of the unit 20 is any well-known protective device for protecting the receiver during operating intervals in which the transmitter 11 sends out a challenging signal, such as one of the devices described in Chapter XI of the text "Principles of Radar," second edition, by the Massachusetts Institute of Technology Radar School Staff, McGraw-Hill, 1946.

The output circuit of the unit 20 is coupled to a wide gate-pulse coincidence mixer 21 which may comprise, for example, a selector circuit such as described at pages 379 and 380 of the text "Waveforms," vol. 19 of the Massachusetts Institute of Technology Radiation Laboratory Series, first edition, edited by Chance, Hughes, MacNichol, Sayre, and Williams, and published by the McGraw-Hill Book Co. in 1949. The number of stages included in the unit 21 preferably is so selected that when a target signal detected in the receiver of the unit 20 is translated by the mixer 21, the output signal of the final stage of the unit 21 is of negative polarity, as indicated by a negative pulse in FIG. 1. The wide gate-pulse coincidence mixer 21 is normally in a nontranslating condition since it is normally biased to cutoff by the operating potentials applied thereto. The operating potentials applied to the mixer 21 are so selected that a pair of pulses of positive polarity and coinciding in time must be applied to the input circuits of the mixer to permit signal translation therethrough.

The output circuit of the wide gate-pulse coincidence mixer 21 is coupled to the input circuit of a synchronized pulse generator 22 which has the output circuit thereof coupled to a diode 61, more fully to be described hereinafter, and to a control circuit 70 for establishing a memory period related to the duration of a tracking period. The control circuit 70, which is constructed in accordance with the invention, will be more fully described hereinafter. The synchronized pulse generator 22 preferably is a multivibrator so constructed that upon application of a negative detected target signal to the input circuit of the generator 22, a negative pulse of long duration relative to the duration of the applied target signal is developed in the output circuit of the generator 22 for application to the diode 61 and to the control circuit 70, as indicated adjacent the circuit diagram. A suitable multivibrator of this type is represented in FIGS. 5–10, and described at pages 167–169, inclusive, of the above-mentioned text entitled "Waveforms."

The receiver portion of the equipment also includes a synchronized gate-pulse generator system 30 for conditioning the wide gate-pulse coincidence mixer 21 to translate pulses received during a gating interval of a preselected duration which is small relative to the maximum time delay between the challenging and target signals. The system 30 simultaneously generates both wide and narrow gate pulses and includes well-known circuits having time constants or other circuit parameters chosen to develop the two types of positive gate pulses of desired duration. In order accurately to time the generation of the gate pulses, it will be understood that the generator system 30 has a synchronizing circuit responsive to synchronizing-signal pulses applied as described hereinafter to initiate an operating cycle of that system. The synchronized gate-pulse generator system 30 may comprise, for example, a pair of monostable multivibrators individually proportioned to generate wide and narrow gate pulses of the type represented in FIG. 12–8 and described at page 590 of the text "Radio Engineering" by F. E. Terman, third edition, published by the McGraw-Hill Book Company in 1947.

One output circuit of the gate-pulse generator system 30 to which the wide gate pulses are delivered is coupled to one input circuit of the wide gate-pulse coincidence mixer 21. The other output circuit of the generator system 30 in which the narrow gate pulses are derived is coupled to the input circuit of a narrow gate-pulse coincidence mixer 31 which is essentially the same in construction as the wide gate-pulse coincidence mixer 21 but is designed to have a higher gain. The output circuit of the receiver portion of the unit 20 is connected to the first stage of the narrow gate-pulse coincidence mixer 31. This stage of the mixer 31 is adjusted to require coincidence in time of a narrow gate pulse from the generator system 30 and a detected target signal from unit 20 to produce an output signal. The narrow gate-pulse coincidence mixer 31 is arranged so that a target signal translated therethrough appears at its output terminals with positive polarity as indicated in FIG. 1.

The occurrence of the wide and narrow gating intervals relative to the transmission of a challenging signal is determined by the generation of the gate pulses and is under the control of means for controlling the application of synchronizing pulses to the synchronizing circuit of the gate-pulse generator system 30. The last-mentioned means comprises a conventional direct-current amplifier 42 having the input circuit thereof coupled to a condenser 62 through a switch blade 79' and a switch contact 79a included in a relay 79. The relay 79, which also includes a winding 79" and a switch contact 79b, forms a part of the present invention and will subsequently be more fully described. The condenser 62 is coupled to a pair of diodes including the diode 61 and another diode 60, more particularly to be described and hereinafter referred to as tracking diodes.

The switch blade 79' is shown in one operating position in which that blade conditions the equipment to track a target in response to received target signals. In the other operating or search position of the switch blade 79', the switch blade couples the input circuit of the direct-current amplifier 42 through the switch contact 79b to the output circuit of a search-sweep generator 41 which develops therein a saw-tooth signal having a long trace portion relative to the repetition period of the challenging signals for controlling the sweeping of each gate pulse over a predetermined range of time delays to accomplish searching. The duration of the trace portion of the saw-tooth output signal of the generator 41 preferably is of the order of 300 times the repetition period of the challenging signals. The output circuit of the amplifier 42 is coupled to a conventional cathode-follower amplifier 43, the cathode-output circuit of which is coupled to means, presently to be described, for applying synchronizing pulses to the synchronizing circuit of the gate-pulse generator system 30.

The last-mentioned means comprises a diode 50 which provides a time delay determined by a delay bias established on its cathode. This bias is applied to the diode 50 through a resistor 52 from the cathode-output circuit of the cathode-follower amplifier 43. The anode of the diode 50 is connected to the output circuit of a saw-tooth signal generator 51 having its synchronizing input circuit coupled to a second output circuit of the master oscillator 10. The saw-tooth signal generator 51 may be of conventional construction and, since it is synchronized by the oscillator 10, operates at the same repetition frequency as the transmitter 11. The saw-tooth signal derived in the output circuit of the generator 51 has a long trace portion relative to the retrace portion of that signal. The trace portion of the generated saw-tooth signal has a duration which is approximately one-thirtieth the repetition period of the challenging signals. This duration is at least equal to the maximum time delay between a challenging signal and a target signal which is indicative of a target within the range of distances over which searching is accomplished.

The cathode of the diode 50 is connected to a conventional wave-shaping and differentiating circuit 53 having an output circuit which applies a differentiated signal as a synchronizing potential to the synchronizing circuit of the gate-pulse generator system 30. The unit 53 preferably includes an amplifier for amplifying and shaping a saw-tooth potential derived from the diode 50 into a rectangular pulse and includes a differentiator for differentiating that pulse and for applying a differentiated pulse of positive polarity to the input circuit of the gate-pulse generator system 30. The amplifier of the unit 53 may include, for example, a circuit of the type represented in FIG. 4(A) and described at pages 2–6 to 2–9, inclusive, of the above-mentioned text entitled "Principles of Radar" while the differentiating circut may also be of a conventional type, for example, that represented in FIGS. 12–16(c) and described at pages 599 and 600 of the above-mentioned text "Radio Engineering."

A range indicator, represented as a voltmeter 90, is utilized for measuring the potential developed across the cathode-output circuit of the cathode-follower amplifier 43. The conductivity of unit 43 is determined by the amplitude of the output signal of the search-sweep generator 41 so that the potential across the output circuit of the amplifier 43 is directly related to the position of the narrow and wide gate pulses during the searching process.

Returning now to a further consideration of the tracking circuit, this circuit includes the pair of diodes 60 and 61 arranged with the anode of the former connected to the output stage of the narrow gate-pulse coincidence mixer 31 and the cathode of the tube 61 connected to the output stage of the synchronized pulse generator 22. The cathode of the diode 60 is connected to the anode of the diode 61 and is arranged to be connected to the input circuit of the direct-current amplifier 42 through the switch contact 79a and the switch blade 79'. The condenser 62 is also connected to the cathode of the diode 60 and the anode of the diode 61. The narrow gate-pulse coincidence mixer 31 and the synchronized pulse generator 22 preferably include suitable sources of bias potential for the diodes 60 and 61, respectively.

The units represented in block diagram and thus far described may be of conventional construction and operation so that a detailed description and explanation of the operation thereof are unnecessary herein.

*General operation of distance-measuring equipment*

Considering briefly, however, the general operation of the above-described distance-measuring equipment as a whole, it will be assumed initially that challenging signals are sent out by the transmitter 11 but that no target signals are received in answer to the challenging signals. As indicated in FIG. 1 by arrows representing the direction of signal-energy flow, when the equipment is first energized, a control pulse from the master oscillator 10 energizes the modulator 12 to initiate the operation of the transmitter 11 thereby to transmit a challenging signal. Referring now to FIG. 2, two cycles of the operation of the distance-measuring equipment are there represented by a graph representing the output signals of various units of the equipment. Portions of the time axes of the curves of FIG. 2 are shown in broken-line construction since, for the purpose of clarity, the time intervals between the initiations of successive cycles of operation have not been represented in their entirety. Considering for the moment the first cycle of operation of the equipment, the transmitted challenging signal is represented by Curve A of FIG. 2 as a pulse of radio-frequency energy $A_0$ occurring at a time $t_0$. Saw-tooth signals developed by the generator 51 are represented by Curve B and the first of these signals $B_0$ is initiated at the time $t_0$. At the time $t_0$ at which the challenging signal $A_0$ is transmitted, the gate-pulse generator system 30 is idle and consequently does not then supply gate pulses to either the wide gate-pulse coincidence mixer 21 or to the narrow gate-pulse concidence mixer 31. For the sake of simplicity, it will be assumed that at the same time $t_0$ the search-sweep generator 41 initiates a saw-tooth signal having a trace portion corresponding to that represented by the dot-dash line Curve C of FIG. 2. A portion of this curve is not shown because of the corresponding discontinuity in Curve B.

As will be made more clear hereinafter, the winding 79" of the relay 79 is energized at the time $t_0$ and the switch blade 79' is attracted to the contact 79b in the search position, thus connecting the output circuit of the search-sweep generator 41 to the input circuit of the direct-current amplifier 42. The amplifier 42 amplifies the saw-tooth signal applied thereto by the generator 41 and applies this amplified signal to the cathode-follower amplifier 43. The amplitude of the input-signal potential applied to the cathode-follower amplifier 43 determines the conductivity of that amplifier and hence determines the potential of the output signal which is developed across the cathode-output circuit of the amplifier 43. The last-mentioned signal, represented by Curve C of FIG. 2, is applied as a delay bias to the cathode of the diode 50 through the resistor 52. This delay bias directly controls the timing of the output signals of the gate-pulse generator system 30 with relation to the occurrence of the challenging signal $A_0$. When the anode potential applied to the diode 50 exceeds the delay bias appearing on the cathode thereof, the diode conducts to supply a signal $D_0$, as represented by Curve D of FIG. 2, to the wave-shaping and differentiating circuit 53. The delay provided by the diode circuit in delivering the signal $D_0$ to the unit 53 initially is zero but may be any greater value as determined by the operating conditions of the system establishing the magnitude of the delay bias applied to the cathode of the diode 50.

Unit 53 responds to the signal $D_0$ applied thereto by the diode 50 and develops a control potential or synchronizing pulse $E_0$, as represented by Curve E, having a leading edge coincident with the leading edge of the challenging signal $A_0$. The synchronizing pulse $E_0$ is applied to the synchronizing circuits of the gate-pulse generator system 30 to cause the latter to generate a wide gate pulse $F_0$ and a narrow gate pulse $G_0$ represented by Curves F and G, respectively. These gate pulses are applied, respectively, to the input circuits of the wide gate-pulse coincidence mixer 21 and the narrow gate-pulse coincidence mixer 31 to condition the mixers to translate detected target signals received throughout the duration of the applied gate pulses. Under the assumed operating conditions in which no target signals are intercepted by the antenna system 13, 14, no output signal is developed by either the wide gate-pulse coincidence mixer 21 or the narrow gate-pulse coincidence mixer 31 even though these coincidence mixers are conditioned to translate pulses throughout the durations of the gate pulses $F_0$ and $G_0$. Commencing at time $t$ the output signal of the saw-tooth signal generator 51 falls rapidly to zero, as represented by Curve B.

When the next challenging signal, represented by Curve A as a pulse of radio-frequency energy $A_{01}$ occurring at time $t_{01}$ is sent out, the build-up of another saw-tooth signal $B_{01}$ is initiated, as represented by Curve B. During this next cycle of operation, however, the output signal of the search-sweep generator 41 has increased to a substantial positive potential at the time $t_{01}$. Accordingly, the amplified output signal of the search-sweep generator 41 represented by Curve C applies an increased delay bias to the cathode of the diode 50 to prevent the diode from conducting prior to a time $t_{11}$. Hence, the next synchronizing pulse $E_{11}$ which is applied to the gate-pulse generator system 30 by the unit 53 is delayed from the challenging signal $A_{01}$ by a delay time interval $t_{01}-t_{11}$. Thus, in FIG. 2 the signals $D_{11}$, $E_{11}$, $F_{11}$, and $G_{11}$ represent, respectively, the saw-tooth output signal of the diode 50, the output signal of the wave-shaping and differentiating circuit 53, and the gate pulses of the generator system 30 in a new time relation to the transmitted challenging signal $A_{01}$ of Curve A. This demonstrates two operating cycles of the transmitter 11 and, under the assumed operating conditions, the delay-time interval increases with each cycle during the searching operation until the wide and narrow gate pulses have advanced to the end of the time-delay range.

When the gate pulses have advanced to the most remote portions of the time-delay range, corresponding to the time required to receive target signals from the most distant targets intended to be contacted by the distance-measuring equipment, and no target signal has been received, the search-sweep generator 41 terminates the first search cycle and initiates another in the manner previously explained.

Having observed the operation of the system in the absence of target signals, consideration may now be given to features of the operation which are significant only in the presence of target signals. As will be made clearer hereinafter, under these operating conditions the relay winding 79" is de-energized and the switch blade 79' is connected to the contact 79a in the tracking position as shown in the diagram. When the search-sweep generator 41 is thus disconnected from the direct-current amplifier 42, the control of the gate pulses with reference to the transmission of the challenging signal is transferred exclusively to the tracking circuit. Referring again to FIG. 2 and considering some subsequent cycle of operation of the equipment, when a detected target signal, represented by Curve S, is related to a wide gate pulse $F_2$ and to a narrow gate pulse $G_2$, the last-mentioned pulses being represented in dotted-line construction, the target signal S occurs within the duration of the wide gate pulse $F_2$ but after the termination of the narrow gate pulse $G_2$. For this condition, signal translation is completed only through units 20, 21, and 22 to the tracking diode 61. Rectification by the tracking diode 61 of the negative output pulse of the synchronized pulse generator 22 causes a negative charge to accumulate on the condenser 62. The negative potential developed on the condenser 62 is applied to the input circuit of the direct-current amplifier 42 to develop a positive output signal in the output circuit thereof. The output signal of the direct-current amplifier 42 is applied to the input circuit of the cathode-follower amplifier 43 and thus increases the potential in the output circuit thereof. Accordingly, the delay bias applied to the diode 50 is increased and both the wide gate pulses and narrow gate pulses are longer delayed relative to the transmission of the challenging signal to bring a target signal such as signal S within the durations of both of its corresponding gate pulses.

When the target signal S occurs within the durations of both gate pulses, signals are simultaneously applied to each of the tracking diodes 60 and 61 but the diode 60 receives a pulse of greater amplitude in view of the high gain of the mixer 31. The over-all result is a change of the potential developed across the condenser 62 in a positive sense, a reduction of the delay bias of diode 50, and a succeeding earlier appearance of the gate pulses. Thus, it is seen that the tracking diodes 60 and 61 by adjusting the time delay of the gate pulses in opposite senses cause the equipment to track target signals when a target signal has been received within the duration of the wide gate pulse.

With the equipment tracking as explained, a reading of distance may be obtained as follows. The desired distance indication is directly related to the delay bias of the diode 50 and, therefore, may be measured by the range-calibrated voltmeter 90 across the cathode-output circuit of the cathode-follower amplifier 43. After the distance measurement has been obtained from the range meter 90, the switch blade 79' may be manually connected to the contact 79b to connect the search-sweep generator 41 to the direct-current amplifier 42 to continue the search previously interrupted, thereby to search for distance indications of other targets within the range of the equipment.

In the foregoing description of the distance-measuring equipment, it has been assumed that a single target is in the range of the equipment to reply to challenging signals thereof. Where several targets concurrently receive a challenging signal of the equipment, it is desirable to permit a selection of a particular target and this is most readily accomplished by coding the transmitted challenging signal. Coding the challenging signal in one embodiment involves transmitting grouped pairs of pulses to constitute a challenge with a preselected spacing between the grouped pulses of each pair identifying the challenging transmitter. Targets such as beacons may also include coding features so that a challenging signal which causes a response from one, is not accepted and answered by the others. Coding in this manner is well known and understood in the art and for that reason a detailed explanation thereof has been omitted for the sake of simplicity.

*Description of control system*

Referring now more particularly to the control system of FIG. 1 which embodies the present invention, that system comprises a control circuit 70 having a time-constant characteristic so proportioned that upon application of signals thereto, it is effective to develop a control effect having an instantaneous value representative of the duration of a tracking period in which the equipment is effective to track a target. More particularly, the control circuit 70 has a first time-constant characteristic so proportioned that upon application of signals thereto, it is effective to develop a control effect having an instantaneous value determined by the duration of the tracking period coincident with the development of the control effect. Specifically, the control circuit 70 includes a coupling condenser 71 coupled between an output terminal of the synchronized pulse generator 22 and the cathode of a diode rectifier 73. The cathode of the diode 73 is coupled to ground through a resistor 72 and the anode of the diode is coupled to an energy-storage condenser 74 which in turn is coupled between ground and a suitable source of energy +B through a resistor 75.

The condenser 74 is also coupled through a resistor 76 to a control or suppressor electrode of a normally conductive electron-discharge device such as a pentode 77. The cathode of the tube 77 is grounded and the anode of the tube is coupled to the source +B through a current-limiting resistor 78 and the relay winding 79″ for controlling the energization of the relay winding 79″ by the source +B. The winding 79″, as previously mentioned, is effective to control the position of the switch blade 79′ of the relay 79, which preferably is a sensitive, fast-acting device.

The control circuit 70 also includes a resistor-condenser network 78, and 80–84, inclusive, coupled to the anode of the tube 77 and to the inner control electrode thereof to provide for the control circuit 70 the above-mentioned time-constant characteristic. More particularly, the time-constant characteristic is such that, upon application of signals to the control circuit 70, that circuit develops a control effect having an instantaneous value related by the aforementioned time-constant characteristic to the duration of the tracking period and having a development time of pretermined duration. Specifically, the control effect under consideration is the potential across the condenser 82 to the extent that it exceeds a predetermined reference value at which the operating mode of the equipment changes from track to search when under the control of the discharge of the condenser 82, as will be more fully explained subsequently. When the equipment initially switches from a search to a tracking mode during the reception of target signals and the potential across the condenser 82 is less than the above-mentioned predetermined value, the control effect may be considered as being of zero value and having zero development rate. The resistor-condenser network just mentioned comprises a resistor 80 and a condenser 82 coupled in a series relation between the anode of the tube 77 and the inner control electrode thereof. The network also includes a resistor 81 and a condenser 83 coupled in a series relation across the condenser 82 and a resistor 84 coupled between the inner control electrode of the tube 77 and ground. The network further includes the resistor 78 and, in determining the aforementioned time-constant characteristic, the network effectively includes the inner control electrode-cathode resistance of the tube 77. The resistor-condenser network 78, and 80–84, inclusive, is so proportioned as to provide for the condenser 82 a long charge time relative to the repetition period of the challenging signals transmitted by the transmitter 11. The charge time of the condenser 82 preferably is of the order of 60 times the repetition period of the challenging signals.

From the foregoing description it will be apparent that means for applying, to the control circuit 70, signals representative of the target signals during the period of response thereto comprises the synchronized pulse generator 22. More particularly, this generator is coupled to the control circuit 70 for applying thereto signals having a timed relation to the target signals. As mentioned previously, the signals applied to the control circuit 70 by the generator 22 are negative pulses of duration long relative to the duration of the target signals and preferably have leading edges coinciding in time with the leading edges of the target signals.

It will be understood further that means responsive to the control effect in the absence of the target signals for conditioning the equipment to track a target during a period determined by the instantaneous value of the control effect includes the previously described tracking circuit and, more particularly, the switch blade 79′. For convenience, the last-mentioned period will be hereinafter referred to as a "memory" period.

The control circuit 70 preferably has parameters so proportioned that the memory period has a maximum duration substantially different from the minimum duration thereof. More particularly, the control circuit 70 has a second time-constant characteristic for so controlling the decay of the control effect as to provide a decay time of duration greater than the duration of the aforementioned development time such that the memory period has a maximum duration substantially different from the minimum duration thereof. This second time-constant characteristic is controlled by the values of the resistors and condensers in the resistor-condenser network 78, and 80–84, inclusive, and the amplification factor of the tube 77. The parameters of the resistor-condenser network 78, and 80–84, inclusive, are so proportioned as to provide for the condenser 82 a long discharge time relative to the repetition period of the challenging signals. The resistor-condenser network is coupled to the tube 77 in the manner previously described to provide for the condenser 82 a discharge time which is longer than the charge time of that condenser.

*Operation of control system*

Considering now the operation of the control system 70 just described, it will be pointed out again that when the relay 79 is de-energized the switch blade 79′ is in the position shown in the diagram. With the switch blade 79′ in this position, the equipment is conditioned to track a target in response to signals indicative thereof, as mentioned previously. On the other hand, when the relay 79 is energized and the switch blade 79′ is in its other operating position, the equipment is normally effective to search for a target in the absence of such target signals.

Assuming for the moment that no target signals are received, it then is desirable for the equipment to search for target signals over the prescribed range of distances. Searching is accomplished by energizing the relay 79 in a manner presently to be described. Under the assumed condition of operation in which no target signals are received, the wide gate-pulse coincidence mixer 21 does not develop an output signal and hence is ineffective to trigger the synchronized pulse generator 22. Accordingly, no output signal is developed by the synchronized pulse generator 22. During this mode of operation the condenser 74 is charged positively and anode-cathode current sufficient to energize the relay 79 then flows in the normally conductive tube 77. The energization of the relay 79 conditions the equipment to search for a target as previously explained.

When target signals are intercepted by the antenna system 13, 14 and amplified by the receiver of unit 20 and the wide gate-pulse coincidence mixer 21, the output signals of the wide gate-pulse coincidence mixer 21 trigger the synchronized pulse generator 22 to produce in the output circuit thereof negative pulses of relatively long duration which are synchronized with the target signals. These negative pulses are applied to the input circuit of the control circuit 70. The diode 73 rectifies the applied pulses and causes the condenser 74 to charge in a negative sense. When a predetermined number of target signals has been received, the condenser 74 is charged to a sufficiently high negative value to render the tube 77 nonconductive. With the tube 77 rendered nonconductive, the relay 79 is de-energized and the switch blade 79′ assumes the tracking position as shown in the diagram. So long as target signals are received, the synchronized pulse generator 22 applies negative pulses to the control circuit 70 to maintain the tube 77 in its nonconductive state. During a time interval in which the tube 77 is rendered nonconductive, the condenser 82 charges in a positive sense in accordance with the first time-constant characteristic of the control circuit 70 determined by the parameters of the resistor-condenser network 78 and 80–84, inclusive, and the inner control electrode-cathode resistance of the tube 77. The charging current for the condenser 82 flows from the source +B to ground through the inner control electrode-cathode resistance of the tube 77 as well as through the resistor 84. Accordingly, the inner control electrode-cathode resistance of the tube 77 is effectively included in the resistor-condenser network during the charge of the condenser 82.

The first time-constant characteristic is represented by the solid-line portion of Curve A of FIG. 3 which is an amplitude-time graph representing the potential developed across the condenser 82. From FIG. 3 it may be seen that after the tube 77 has been rendered nonconductive for a time interval $t_2-t_5$, the condenser 82 will have charged approximately to its maximum potential. The time interval $t_2-t_5$ represents the development time of predetermined duration of the above-mentioned control effect developed by the control circuit 70 and may be of the order of four seconds.

Assume now that at a time $t_5$ the target signals are lost for any of the previously mentioned reasons. Accordingly, the synchronized pulse generator 22 no longer applies to the control circuit 70 signals related to the target signals. The condenser 74 then rapidly charges toward its initial positive potential and renders the tube 77 conductive at approximately time $t_5$. As the tube 77 begins to conduct the anode potential thereof falls slightly. This decrease in anode potential is coupled by a portion of the resistor-condenser network 78 and 80–84, inclusive, to the inner control electrode of the tube 77. Accordingly, the decrease in the anode potential of the tube 77 drives the inner control electrode thereof in a negative sense and prevents the tube 77 from becoming fully conductive immediately. Since the tube 77 does not become fully conductive immediately at the time $t_5$, the anode potential thereof falls slowly and thus, the tube 77 and the resistor-condenser network 78 and 80–84, inclusive, conjointly provide for the condenser 82 a long discharge time relative to the charge time thereof. Accordingly, the discharge of the condenser 82 is determined by the aforementioned second time-constant characteristic which controls the decay of the control effect. The second time-constant characteristic is represented by the dashed-line portion of Curve A of FIG. 3. From this curve it may be seen that the decay time of the control effect has a duration $t_5-t_6$ greater than the predetermined duration of the development time $t_2-t_5$. Specifically, the decay time may, for example, be of the order of six seconds. This longer decay time is caused by the so-called Miller "run-down" effect just described or, in other words, by the apparent increase in the capacitance of the condensers 82 and 83 due to the amplification factor of the tube 77.

Because of the long discharge time of the condenser 82, the tube 77 is not rendered fully conductive and the relay 79 is not energized immediately upon the loss of target signals. Instead the relay 79 is energized after substantially the decay time of six seconds has elapsed as represented by the time interval $t_5-t_6$ of FIG. 3. This is because the potential across the condenser 82 falls below a predetermined potential, indicated by a dashed line B, which is the minimum potential across the condenser capable of maintaining sufficiently small current flow through the tube 77 to prevent energization of the relay 79 after the failure of target signals. Accordingly, under the assumed operating conditions in which the signal is received at least during the time interval $t_2-t_5$ or two seconds, the equipment is conditioned to track a target in the absence of target signals during a memory period related to the instantaneous value of the control effect, or specifically, during a period of substantially six seconds.

On the other hand, when target signals are received during a tracking period of duration less than the time interval $t_2-t_5$, the condenser 82 will not have fully charged before the loss of the target signals. Accordingly, the control effect developed under these operating conditions has an instantaneous value less than the instantaneous value developed when target signals are received at least during the time interval $t_2-t_5$. Hence, the time required to discharge the condenser 82 to the initial operating potential thereof is less than previously when the target signals were received throughout the time interval $t_2-t_5$. Accordingly, the tube 77 is rendered fully conductive and the relay 79 is energized sooner than six seconds after the loss of the target signals.

From the foregoing explanation of the operation of the control system, it may be seen that the control effect conditions the equipment to track a target in the absence of target signals during a memory period related to the duration of the tracking period. Curve A of FIG. 4 is a graph which represents a preferred relation of the duration of the memory period to the duration of the tracking period. From FIG. 4 it will be seen that, after the distance-measuring equipment has tracked a target during a tracking period not longer than a time interval $t_2-t_3$ which may be of the order of one-half second, the memory period is substantially zero. This is because the potential across the condenser 82 is less than the potential B during the time interval $t_2-t_3$ and, therefore, the tube 77 becomes sufficiently conductive to energize the relay 79 almost immediately upon the loss of target signals during the interval $t_2-t_3$. Accordingly, during the time interval $t_2-t_3$, the control effect, that is, the potental across the condenser 82 to the extent that it exceeds the potential B, has zero value and thus zero development rate. If the equipment has tracked a target during a tracking period of duration greater than the time interval $t_2-t_3$ but less than a time interval $t_2-t_5$, the equipment is conditioned to track the target in the absence of target signals during a memory period having a duration intermediate the minimum and maximum durations thereof. Specifically, when the equipment has tracked a target during a tracking period of duration less than the time interval $t_2-t_5$, the memory period will have a duration between zero and six seconds as represented by the graph of FIG. 4. When the equipment has tracked a target during a tracking period of duration greater than the time interval $t_2-t_5$, the memory period has the maximum duration of six seconds.

From the foregoing description it will be seen that a control system for target position-indicating equipment embodying the invention has the advantage that the equipment is conditioned in the absence of target signals to track a target during a memory period having a duration which is variable over a wide range and is related to the duration of a tracking period.

While there has been described what is at present considered to be the preferred embodiment of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A system for tracking a target by receiving target signals therefrom comprising: means for searching for target signals; means for discontinuing searching and commencing tracking upon reception of target signals and effective upon cessation of reception for causing resumption of searching, this means tending to be responsive also to spurious signals; and means for delaying such resumption of searching by a period which is small for small numbers of signals received but which increases with the number of signals received so that after prolonged tracking search is not resumed upon momentary cessation of target signals and prolonged interruption of searching due to actuation of the search discontinuing means by spurious signals is avoided.

2. A system for tracking a target by receiving target signals therefrom comprising: means for searching for target signals; means for discontinuing searching and commencing tracking upon reception of target signals and effective upon cessation of reception for causing resumption of searching, this means tending to be responsive also to spurious signals; and means for delaying such resumption of searching by a period which is small for small numbers of signals received but which increases with the number of signals received and subsequently becomes constant so that after prolonged tracking search is not resumed upon momentary cessation of target signals and prolonged interruption of searching due to actuation of the search discontinuing means by spurious signals is avoided.

3. A system for tracking a target by receiving target pulses therefrom comprising: means for searching for target pulses; means for discontinuing searching and commencing tracking upon reception of target pulses and effective upon cessation of reception for causing resumption of searching, this means tending to be responsive also to spurious pulses; and means for delaying such resumption of searching by a period which is small for small numbers of pulses received but which increases with the numbers of pulses received so that after prolonged tracking search is not resumed upon momentary cessation of target pulses and prolonged interruption of searching due to actuation of the search discontinuing means by spurious pulses is avoided.

4. A system for tracking a target by receiving target pulses therefrom comprising: means for searching for target pulses; means for discontinuing searching and commencing tracking upon reception of target pulses and effective upon cessation of reception for causing resumption of searching, this means tending to be responsive also to spurious pulses; and means, including a condenser across which a control signal is developed to control said latter means having an amplitude which is small for small numbers of pulses received but which increases with the number of pulses received and subsequently becomes constant, for delaying such resumption of searching by a period which is small for small numbers of pulses received but which increases with the number of pulses received so that after prolonged tracking search is not resumed upon momentary cessation of target pulses and prolonged interruption of searching due to actuation of the search discontinuing means by spurious pulses is avoided.

5. A system for tracking a target by sending challenging signals thereto and by receiving target response signals therefrom comprising: means for searching for target response signals; means for discontinuing searching and commencing tracking upon reception of target response signals and effective upon cessation of reception for causing resumption of searching, this means tending to be responsive also to spurious signals; and means for delaying such resumption of searching by a period which is small for small numbers of signals received but which increases with the number of signals received so that after prolonged tracking search is not resumed upon momentary cessation of target response signals and prolonged interruption of searching due to actuation of the search discontinuing means by spurious signals is avoided.

6. A system for tracking a target by sending challenging signals thereto and by receiving target response signals therefrom comprising: means for searching for target response signals; means for discontinuing searching and commencing tracking upon reception of target response signals and effective upon cessation of reception for causing resumption of searching, this means tending to be responsive also to spurious signals; and means, including a condenser across which a control signal is developed to control said latter means having an amplitude which is small for small numbers of signals received but which increases with the number of signals received and subsequently becomes constant, for delaying such resumption of searching by a period which is small for small numbers of signals received but which increases with the number of signals received and subsequently becomes constant so that after prolonged tracking search is not resumed upon momentary cessation of target response signals and prolonged interruption of searching due to actuation of the search discontinuing means by spurious signals is avoided.

References Cited in the file of this patent

UNITED STATES PATENTS

| | | |
|---|---|---|
| 2,491,029 | Brunn | Dec. 13, 1949 |
| 2,516,356 | Tull et al. | July 25, 1950 |
| 2,886,810 | Gleason | May 12, 1958 |